US012743353B2

(12) United States Patent
Yeh Liu et al.

(10) Patent No.: US 12,743,353 B2
(45) Date of Patent: Sep. 22, 2026

(54) METHOD AND NON-TRANSITORY COMPUTER-READABLE STORAGE MEDIUM AND APPARATUS FOR PERFORMING SUDDEN POWER OFF RECOVERY PROCESS

(71) Applicant: Silicon Motion, Inc., Zhubei City (TW)

(72) Inventors: Yu-Lin Yeh Liu, Miaoli County (TW); Szu-I Yeh, Hsinchu County (TW)

(73) Assignee: SILICON MOTION, INC., Zhubei City (TW)

( * ) Notice: Subject to any disclaimer, the term of this patent is extended or adjusted under 35 U.S.C. 154(b) by 21 days.

(21) Appl. No.: 19/091,418

(22) Filed: Mar. 26, 2025

(65) Prior Publication Data

US 2026/0154167 A1 Jun. 4, 2026

(30) Foreign Application Priority Data

Nov. 29, 2024 (CN) ......................... 202411732175.1

(51) Int. Cl.
*G06F 11/00* (2006.01)
*G06F 11/20* (2006.01)
*G06F 12/02* (2006.01)

(52) U.S. Cl.
CPC ...... *G06F 11/2089* (2013.01); *G06F 12/0253* (2013.01); *G06F 2212/7205* (2013.01)

(58) Field of Classification Search
CPC ............. G06F 11/2089; G06F 12/0253; G06F 2212/7205
See application file for complete search history.

(56) References Cited

U.S. PATENT DOCUMENTS

| | | | | |
|---|---|---|---|---|
| 11,194,502 | B1 | 12/2021 | Lin | |
| 12,149,260 | B2 | 11/2024 | Kuo et al. | |
| 12,210,775 | B2 | 1/2025 | Lee et al. | |
| 2017/0177469 | A1* | 6/2017 | Hashimoto | G06F 12/0246 |
| 2021/0109855 | A1* | 4/2021 | Watt | G06F 12/0253 |
| 2023/0205461 | A1 | 6/2023 | Lee et al. | |

FOREIGN PATENT DOCUMENTS

| | | | |
|---|---|---|---|
| TW | I748542 | B | 12/2021 |
| TW | I804359 | B | 6/2023 |
| TW | 202326440 | A | 7/2023 |

* cited by examiner

*Primary Examiner* — Jason B Bryan
(74) *Attorney, Agent, or Firm* — Birch, Stewart, Kolasch & Birch, LLP

(57) ABSTRACT

The invention introduces a method for performing a sudden power off recovery (SPOR) process, performed by a processing unit of a flash controller, to include: performing operations for the SPOR process after regaining power; and performing operations for a reduced garbage collection (GC) process. An execution time of the operations for the SPOR process and the reduced GC process is limited to a preset time that a host side waits for a completion of the SPOR process by the flash controller.

20 Claims, 7 Drawing Sheets

METHOD AND NON-TRANSITORY COMPUTER-READABLE STORAGE MEDIUM AND APPARATUS FOR PERFORMING SUDDEN POWER OFF RECOVERY PROCESS

CROSS-REFERENCE TO RELATED APPLICATIONS

This application claims the benefit of priority to Patent Application No. 202411732175.1, filed in China on Nov. 29, 2024; the entirety of which is incorporated herein by reference for all purposes.

BACKGROUND

The disclosure generally relates to storage devices and, more particularly, to a method, a non-transitory computer-readable storage medium and an apparatus for performing sudden power off recovery (SPOR) process.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. How to improve the access performance of NAND flash memory has always been an important issue for NAND controllers.

SUMMARY

In an aspect of the invention, an embodiment introduces a method for performing sudden power off recovery (SPOR) process, performed by a processing unit of a flash controller, to include the following steps: performing operations for the SPOR process after regaining power; and performing operations for a reduced garbage collection (GC) process.

In another aspect of the invention, an embodiment introduces a non-transitory computer-readable storage medium having stored therein program code that, when loaded and executed by a processing unit, causes the processing unit to perform the method for performing SPOR process as described above.

In still another aspect of the invention, an embodiment introduces an apparatus for performing SPOR process, to include: a processing unit. The processing unit is arranged operably to: perform operations for the SPOR process after regaining power; and perform operations for a reduced GC process.

An execution time of the operations for the SPOR process and the reduced GC process is limited to a preset time that a host side waits for a completion of the SPOR process by the flash controller.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
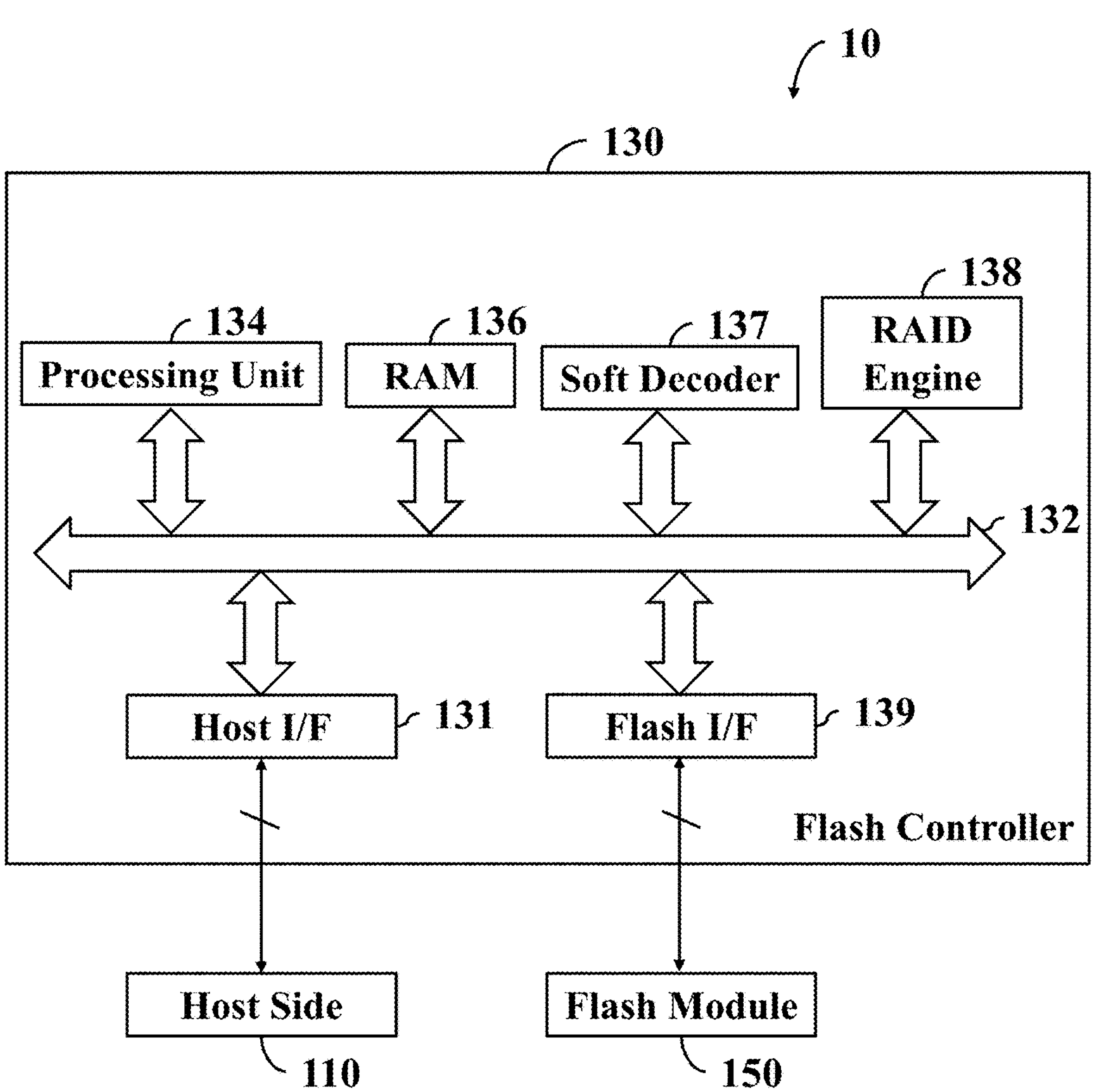
FIG. 1 is the system architecture of an electronic apparatus according to an embodiment of the invention.

Refer to FIG. 1. The electronic apparatus 10 includes the host side 110, the flash controller 130 and the flash module 150, and the flash controller 130 and the flash module 150 may be collectively referred to as a device side. The electronic apparatus 10 may be included in an external storage device, a Personal Computer (PC), a laptop PC, a tablet PC, a mobile phone, a digital camera, a digital recorder, a smart television, a smart freezer, an automotive electronics system or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host interface (I/F) 131, such as write commands, read commands, discard commands, erase commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-address to flash-address mapping (H2F) tables, flash-address to host-address mapping (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136, the soft decoder 137, the Redundant Array of Independent Disks (RAID) engine 138 and the flash I/F 139. A direct memory access (DMA) circuitry of a component moves data between specific components through the bus architecture 132 according to instructions or control signals. For example, a DMA circuitry of the host I/F 131, the soft decoder 137, the RAID engine 138 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
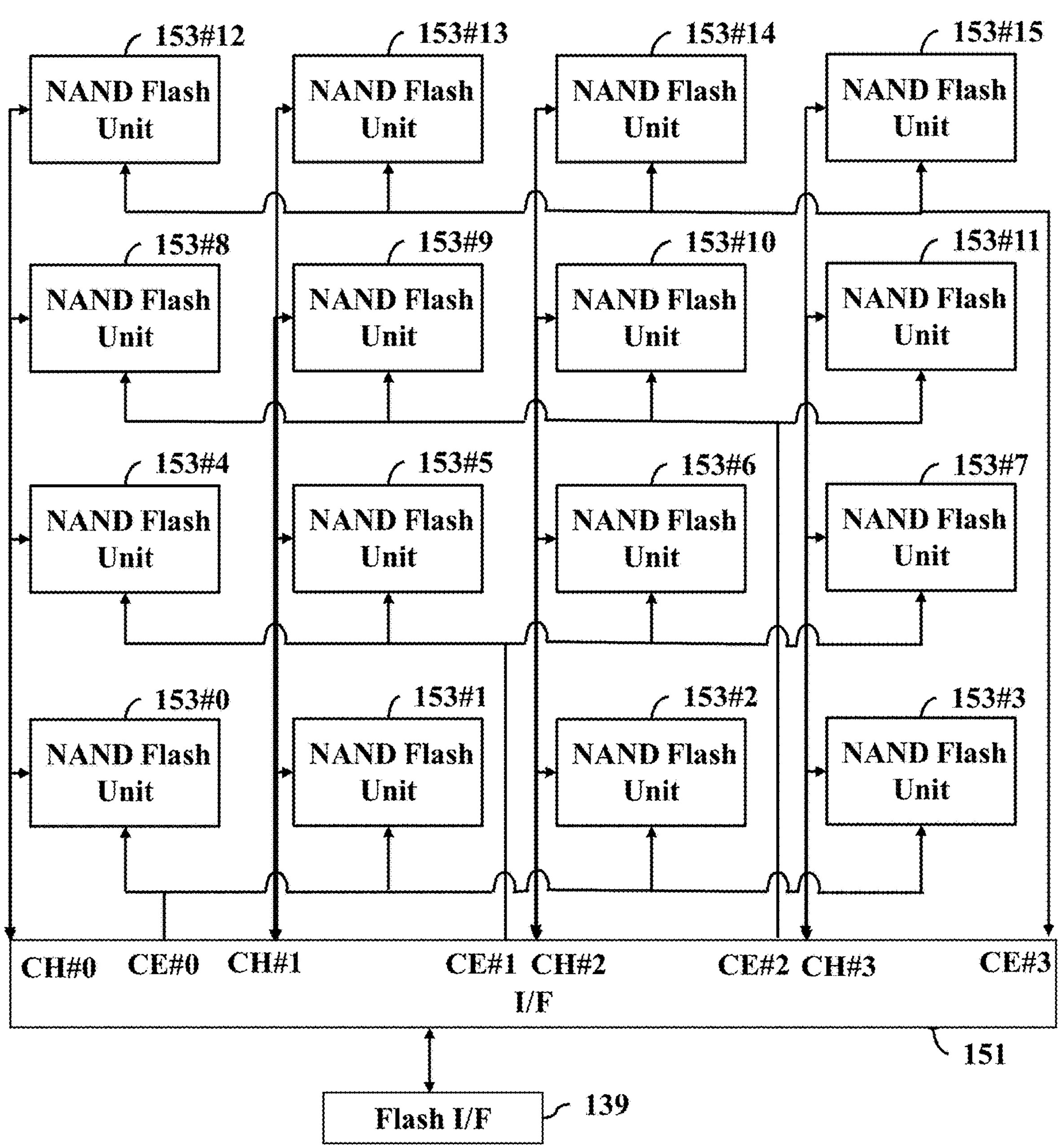
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash units, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
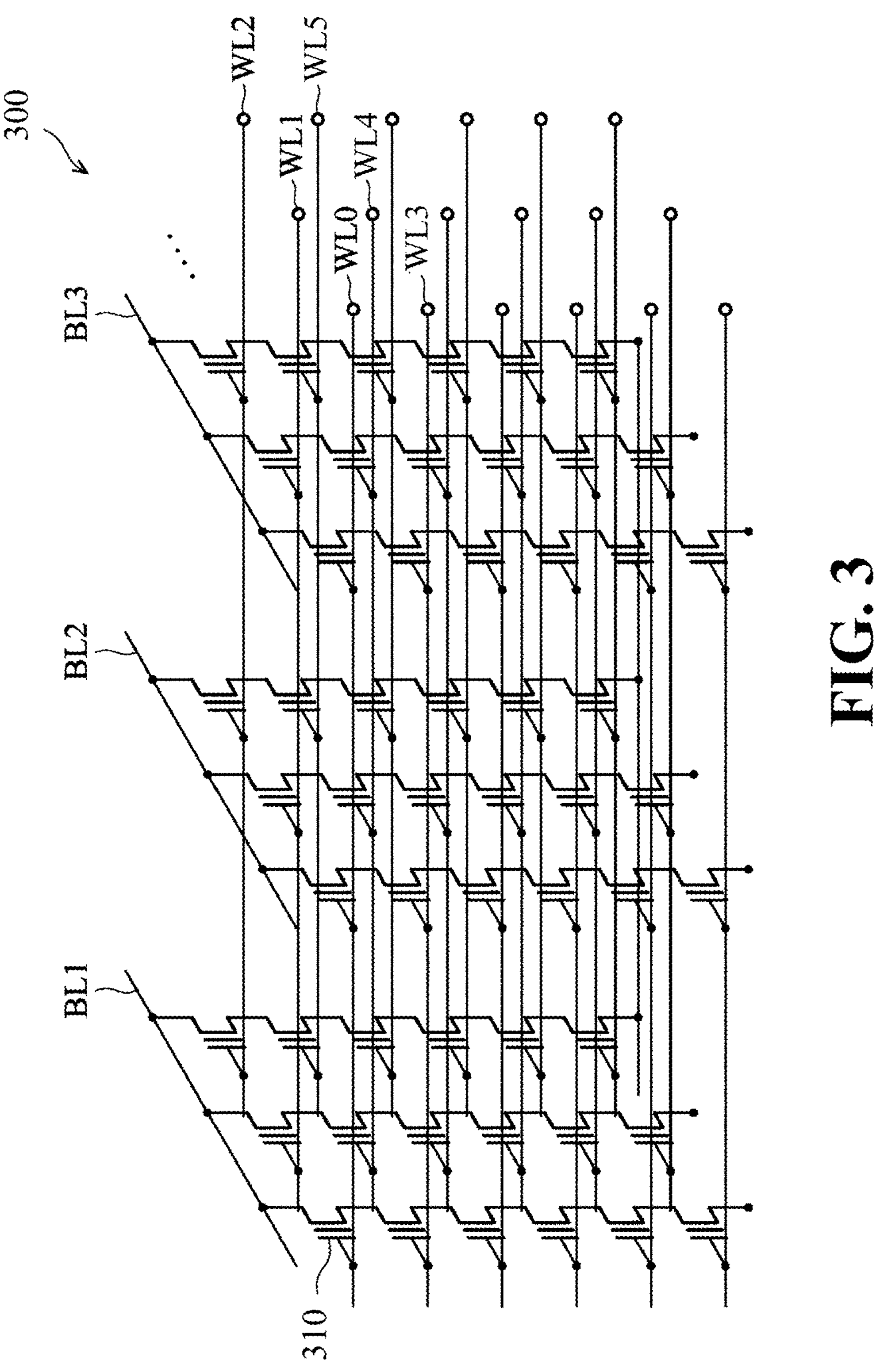
FIG. 3 is a schematic diagram showing the hardware architecture of a portion of a NAND flash unit according to an embodiment of the invention.

Refer to FIG. 3 showing the hardware architecture of a portion of a NAND flash unit. Each NAND flash unit may contain a plurality of memory blocks (e.g. the memory block 300) and the memory block 300 contains multiple memory cells, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on each of the word lines WL0 to WL2 and WL3 to WL5 store data on one or more pages.

Each NAND flash unit may include multiple data planes, each data plane may include multiple physical blocks. In order to improve the data programming and data reading efficiency, designated physical pages of multiple data planes across multiple NAND flash units are organized into one super page (SP). For example, in the exemplary configuration as shown in FIG. 2, each NAND flash unit includes four data planes, and each data plane includes at least one physical page of four kilobytes (KB). One SP stores user data of 256 KB (=4 channels×4 CE×4 data planes×4 KB). One super block (SB) is composed of multiple SPs. In some embodiments, any SB may be configured as a Single Level Cell (SLB) SB and each SP in the SLC SB is called SLC SP. In alternative embodiments, any SB may be configured as a Multi-Level Cell (MLC) SB and each SP in the MLC SB may be a most significant bit (MSB) SP or a least significant bit (LSB) SP. In still alternative embodiments, any SB may be configured as a Triple Level Cell (TLC) SB and each SP in the TLC SB may be an MSB SP, a center significant bit (CSB) SP or an LSB SP. In still alternative embodiments, any SB may be configured as a Quad-Level Cell (QLC) SB and each SP in the QLC SB may be a top significant bit (TSB) SP, an MSB SP, a CSB SP or an LSB SP.

In some embodiments, one logical block address (LBA) managed by the host side 110 may represent user data of 512 bytes (B), and each physical page may be divided into eight sections in 512B. An LBA number is referred to as a logical address managed by the host side 110. An SB, a physical page and a section may be identified by a super-block number, a physical page number and a section number, respectively, and the combination of the numbers is referred to as a physical address of the flash module 150. In alternative embodiments, one host page number managed by the host side 110 may represent user data of 4 KB and each physical page is not necessary to divide into sections. A host page number is referred to as a logical address managed by the host side 110. An SB and a physical page may be identified by a super-block number and a physical page number, respectively, and the combination of the numbers is referred to as a physical address of the flash module 150.

Each SB is labeled as a data block or a current block according to its function. The processing unit 134 may select an empty SB as the current block for preparing to program user data received from the host side 110. The processing unit 134 maintains the F2H table for each current block. Each F2H table contains multiple records. Each record stores information indicating which logical address of user data that is associated with (or mapped by) a specific physical page in the current block. The records in the F2H table are stored in the order of the page numbers of physical pages in the current block. The logical address is expressed by a logical block address (LBA), a host page number or other expression and is managed by the host side 110. The processing unit 134 may drive the flash I/F 139 to program the corresponding F2H table in the RAM 136 into the data region of the designated physical page of one current block after all physical pages of this current block are fully stored in user data, or the remaining physical pages of this current block are filled with dummy values. For example, one current block may be divided into multiple banks, and the records of the F2H table corresponding to one bank of the current block are programmed into the last physical page of this bank. The current block is changed to the data block after all records of the corresponding F2H table have been programmed into the flash module 150, and the user data stored in the data block cannot be modified. Subsequently, the processing unit 134 selects an empty SB as a new current block.

In order to achieve data error tolerance, the processing unit 134, or the dedicated circuitry in the flash I/F 139 executes encoding algorithms for generating error correcting code (ECC) according to user data of each page, and the processing unit 134 programs the user data together with the ECC into the flash module 150 through the flash I/F 139, so that error bits in the user data read from the flash module 150 in the future can be corrected. The ECC may be Low-Density Parity Check Code (LDPC), Bose-Chaudhuri-Hocquenghem (BCH) code, or others. Taking 1 KB user data as an example, BCH code can be used to correct at most 72 error bits while LDPC can be used to correct at most 128 error bits.

For example, LDPC is a linear error correcting code, and the generation of LDPC can be expressed with the following formula:

$$MSG_{1\times n} \odot PCM_{n\times(n+m)} = CW_{1\times(n+m)}$$

where $MSG_{l\times n}$ represents a l-row, n-column matrix of user data, $PCM_{n\times(n+m)}$ represents a n-row, (n+m)-column of parity check matrix, $CW_{l\times(n+m)}$ represents a l-row, (n+m)-column matrix of final codeword, and $\odot$ represents the modulo 2 multiplication. The parity check matrix may include a Quasi-Cyclic (QC) structure. The value of the first n bits in $CW_{l\times(n+m)}$ is equal to the value of $MSG_{l\times n}$ and the value of the last m bits in $CW_{l\times(n+m)}$ is referred to as LDPC. An example is as follows:

$$(1\ 0\ 1) \odot \begin{pmatrix} 1 & 0 & 0 & 1 & 0 & 1 \\ 0 & 1 & 0 & 1 & 1 & 1 \\ 0 & 0 & 1 & 1 & 1 & 0 \end{pmatrix} = (1\ 0\ 1\ 0\ 1\ 1)$$

Those artisans know that a well-known efficient algorithm (such as 2-stage encoding, etc.) with a corresponding parity check matrix can be used to generate LDPC.

Figure 4:
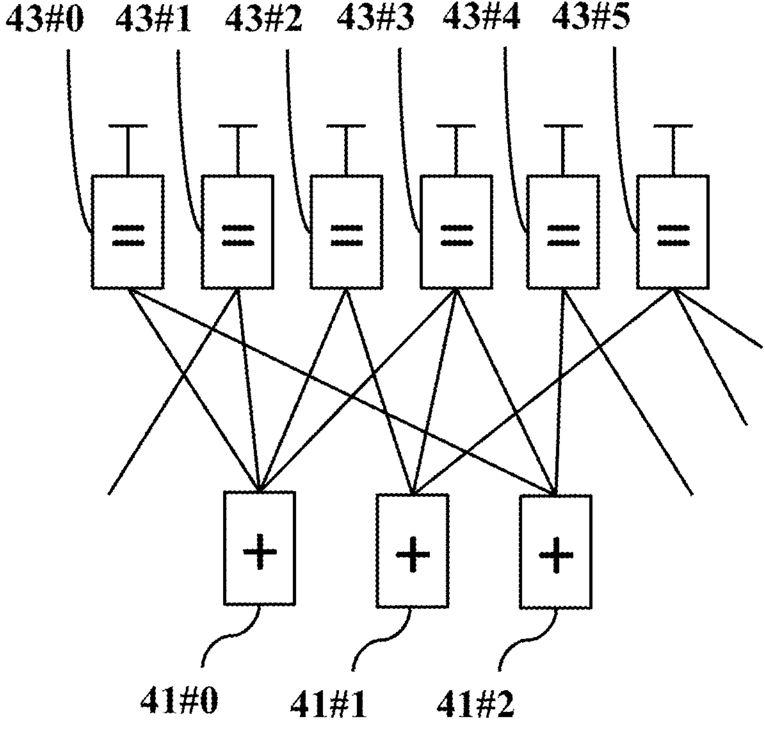
FIG. 4 is a schematic diagram showing an exemplary Low-Density Parity-Check (LDPC) code (n=3, k=6) according to an embodiment of the invention.

The processing unit 134 drives the soft decoder 137 to verify codewords (each including user data and an LDPC) from the flash module 150 through the flash I/F 139 and determine whether each codeword includes any error bit. Once discovering any error bit in any codeword, the processing unit 134 attempts to drive the soft decoder 137 for recovering a correct codeword and obtaining the user data from the correct one. If the correct codeword cannot be recovered after a predetermined number of attempts, the soft decoder 137 determines that the codeword is an uncorrectable codeword. Regarding LDPC decoding, refer to FIG. 4 showing an exemplary (n=3, k=6) LDPC. Blocks 43 #0 to 43 #5 represent variable nodes and blocks 41 #0 to 41 #2 represent check nodes. Bit values of the variable nodes 43 #0 to 43 #5 form a codeword composed of user data and an LDPC, and the bit values of the codeword satisfy the graphical constraints. Specifically, all lines connecting to a variable node have the same value, and all values connecting to a check node must sum, modulo two, to zero (that is, they must sum to an even number; or there must be an even number of odd values). The check nodes 41 #0 to 41 #2 also referred to as syndromes.

The soft decoder 137 includes two important circuitries: the check-node calculation circuitry and the variable-node calculation circuitry. The check-node calculation circuitry performs the modulo 2 multiplication on each hard bit or variable node with the parity check matrix to calculate syndromes. The variable-node calculation circuitry executes a well-known bit flipping algorithm to generate new variable nodes according to the soft bits corresponding to hard bits or variable nodes, and the syndromes, and uses a well-known formula to calculate soft bits of the new variable nodes. The RAM 136 allocates space for storing the hard bits and the variable nodes, and the soft bits corresponding to the hard bits and the variable nodes. The codeword initially read from the designated page of the flash module 150 is composed of hard bits. In some embodiments, the flash I/F 139 may include the soft-bit calculation circuitry for calculating one or more soft bits for each hard bit in the codeword when being read. It is noted that the soft decoder 137 consumes a period of time to perform multiple iterations of operations to attempt to recover the correct codeword.

In alternative embodiments, those artisans may implement the algorithms executed in the check-node calculation circuitry and the variable-node calculation circuitry of the dedicated soft decoder 137 as software code, so that the software code can be loaded and executed by the processing unit 134. It is noted that the time required to use software code to complete the above functions is usually longer than the running time of the dedicated soft decoder 137.

When the user data of the read page contains more error bits than the correction capability with the error correction code, the soft decoder 137 cannot recover the correct codeword. In order to enhance the data error tolerance of the device side, the flash controller 130 sets a predetermined number of pages to form a page group and generates a parity page according to the user data of the page group. For example, Pages P #0 to P #6 form a page group. Each page contains 4096 bytes of user data, and ECC generated from the user data. For example, ECC #0 stands for the ECC of the page P #0, ECC #1 stands for the ECC of the page P #1, and so on. The processing unit 134 drives the RAID engine 138 to execute the RAID encoding algorithms for generating data of the parity page according to the user data and the ECC in the pages P #0 to P #6. Data of the parity page may be generated by Equation 1:

$$P_j = d_{p0,j} \oplus d_{p1,j} \oplus d_{p2,j} \oplus d_{p3,j} \oplus d_{p4,j} \oplus d_{p5,j} \oplus d_{p6,j}$$

where j is an arbitrary integer ranging from 0 to 4095, p0 represents the $0^{th}$ page, p1 represents the $1^{st}$ page, p2 represents the $2^{nd}$ page, and so on, Pj represents the $j^{th}$ data bit of the parity page, $d_{p0,j}$ represents the $j^{th}$ data bit of the $0^{th}$ page, $d_{p1,j}$ represents the $j^{th}$ data bit of the $1^{st}$ page, $d_{p2,j}$ represents the $j^{th}$ data bit of the $2^{nd}$ page, and so on. If error bits of one page cannot be corrected with the corresponding ECC, then the processing unit 134 omits this page and drives the RAID engine 138 to generate the corrected user data of this page by applying XOR operations on data bits of the other pages and the parity page of the same page group. Suppose that the error bits of the $1^{st}$ page cannot be corrected with the corresponding ECC, data bits of the error page may be recovered by Equation 2:

$$d_{p1,j} = d_{p0,j} \oplus d_{p2,j} \oplus d_{p3,j} \oplus d_{p4,j} \oplus d_{p5,j} \oplus P_j$$

The parity of the parity page may also be referred to as RAID ECC with respect to its functions. It is noted that the RAID engine 138 consumes a period of time to read a great number of pages during the recovery of erroneous pages.

In alternative embodiments, those artisans may implement the algorithms executed in the RAID engine 138 as software code, so that the software code can be loaded and executed by the processing unit 134. It is noted that the time required to use software code to complete the above functions is usually longer than the running time of the dedicated RAID engine 138.

A momentary power outage (or sudden power off—SPO) caused by nature or man-made may interrupt the data programming operations of the flash module 150. When the power is restored, the processing unit 134 performs the sudden power off recovery (SPOR) process to detect the last correctly programmed page in the current block of the flash module 150 that was programmed before the momentary power outage, and rebuild the H2F table to reflect the status of all pages in the current block that were correctly programmed into the flash module 150 before the momentary power outage. The H2F table contains multiple records in the order of logical addresses for storing information about which physical address that user data of each logical address is actually stored at.

After regaining power subsequent to a SPO, the host side 110 usually waits for a preset time, for example, any time from 0.8 to 1 second, without issuing any host command to the device side to wait for the device side (specifically, the flash controller 130) to complete the SPOR process. For example, the host side 110 sends a query request to the flash controller 130 and the query request carries information about writing 1 to the flag "fDeviceInit" to notify the flash controller 130 to start performing the device initialization operations. Next, after the preset time, the host side 110 sends a query request to the flash controller 130 and the query request carries information about reading the flag "fDeviceInit". If the device side has completed the device initialization operations, then the flash controller 130 sends a query response to the host side 110 and the flag "fDeviceInit" carried in the query response, which is set to "0". If the device side hasn't completed the device initialization operations, then the flag "fDeviceInit" carried in the query response, which is set to "1". However, the device side only takes about 300 to 500 milliseconds (ms) to complete the ordinary operations for the SPOR process. In order to effectively utilize the time during which the host side 110 waits for the SPOR process, an embodiment of the invention not only performs the operations for the SPOR process, but also the operations for the reduced garbage collection (GC) process. The operations for performing the SPOR process and the reduced GC process are limited to the preset time as described above.

After numerous accesses, one physical block (or SB) may include valid and invalid pages (also referred to as stale pages), in which the valid pages store valid user data while the invalid pages store invalid (old) user data. In the regular GC process, the processing unit 134 drives the flash I/F 139 to issue read instructions to instruct the flash module 150 to read and collect user data of the valid pages of one or more physical blocks (also referred to as source blocks), and then, drives the flash I/F 139 to issue write instructions to instruct the flash module 150 to re-program the collected user data into the current block (also referred to as the destination block). Subsequently, the source block storing no valid user data can be erased to provide new data storage space. Compared with the regular GC process, the reduced GC process mainly shortens the time of reading and collecting user data of valid pages in the source blocks. Its technical details will be described in the following paragraphs.

Figure 5:
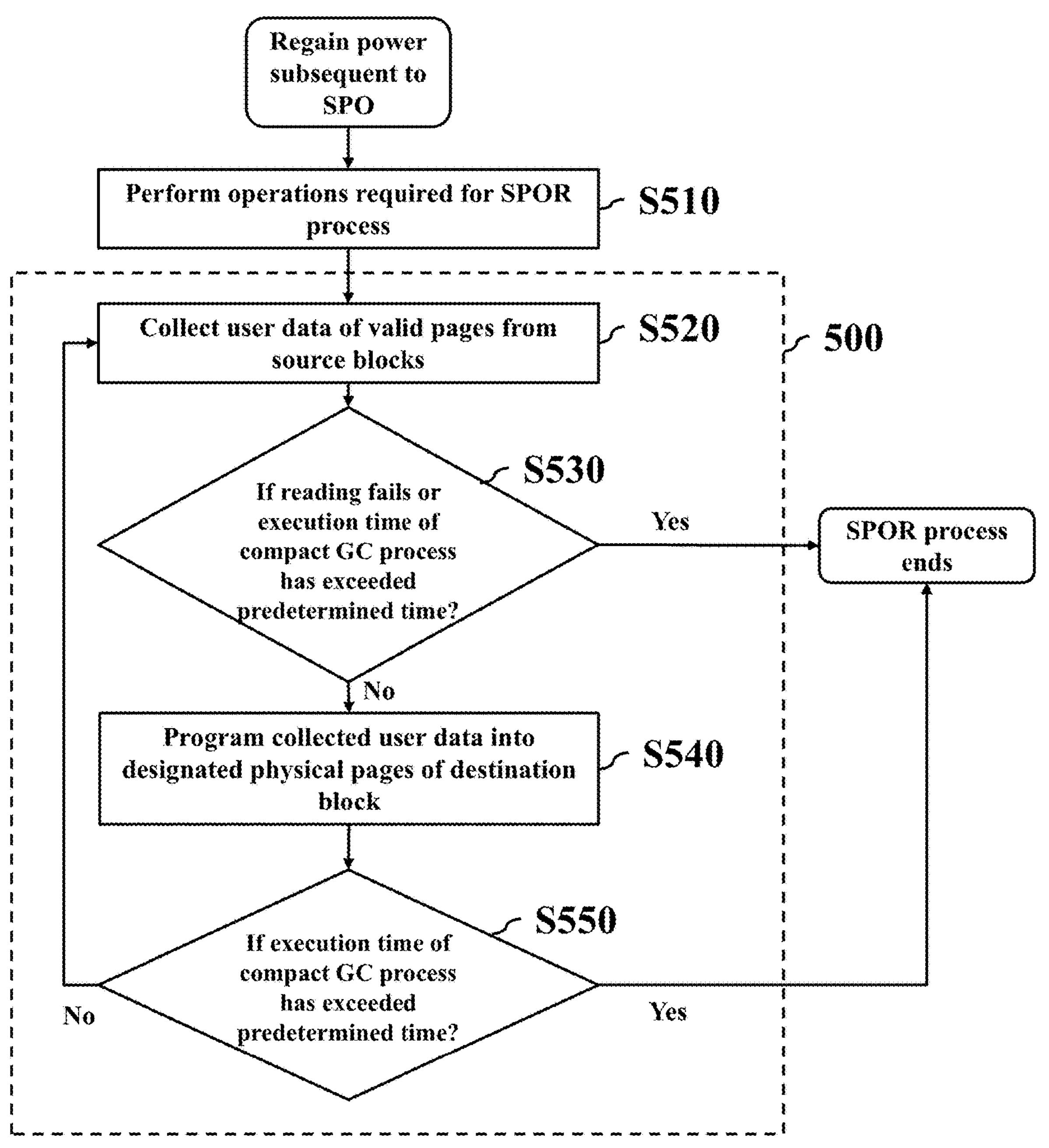
FIG. 5 is a flowchart illustrating a method for performing the optimized sudden power off recovery (SPOR) process according to an embodiment of the invention.

In an aspect, refer to the flowchart as shown in FIG. 5. The processing unit 134 when loading and executing program code of boot program performs the method for the optimized SPOR process. Detailed description are provided as follows:

Step S510: The operations required for the SPOR process as described above are performed.

After the operations required for the SPOR process have completed, the reduced GC process 500 is performed. The reduced GC process 500 includes a loop composed of steps S520, S530, S540 and S550. The reduced GC process 500 collects user data of valid pages from multiple source blocks and programs the collected user data into physical pages of the destination block within the preset time. At the beginning of the reduced GC process 500, the boot program may start a timer to count from 0.

Step S520: User data of valid pages in a source block is collected (or read) from the flash module 150.

Step S530: It is determined whether a reading fail has occurred, or the execution time of the reduced GC process has exceeded the predetermined time. For example, the reading fail may indicate that the source block is marked as bad blocks. If so, the entire process ends to exit the SPOR process. Otherwise, the process proceeds to step S540.

Step S540: The collected user data is programmed into designated physical pages of the destination block.

Step S550: It is determined whether the execution time of the reduced GC process has exceeded the predetermined time. If so, the entire process ends to exit the SPOR process. Otherwise, the process proceeds to step S520.

The predetermined time set in steps S530 and S550 may be any time from 400 ms to 500 ms.

In steps S530 and S550, specifically, the boot program determines whether the counting value of the timer exceeds the predetermined time. If so, it means that the execution time of the reduced GC process has exceeded the predetermined time. That is, the counting value of the timer indicates the execution time of the reduced GC process detected in step S530 or S550.

Figure 6:
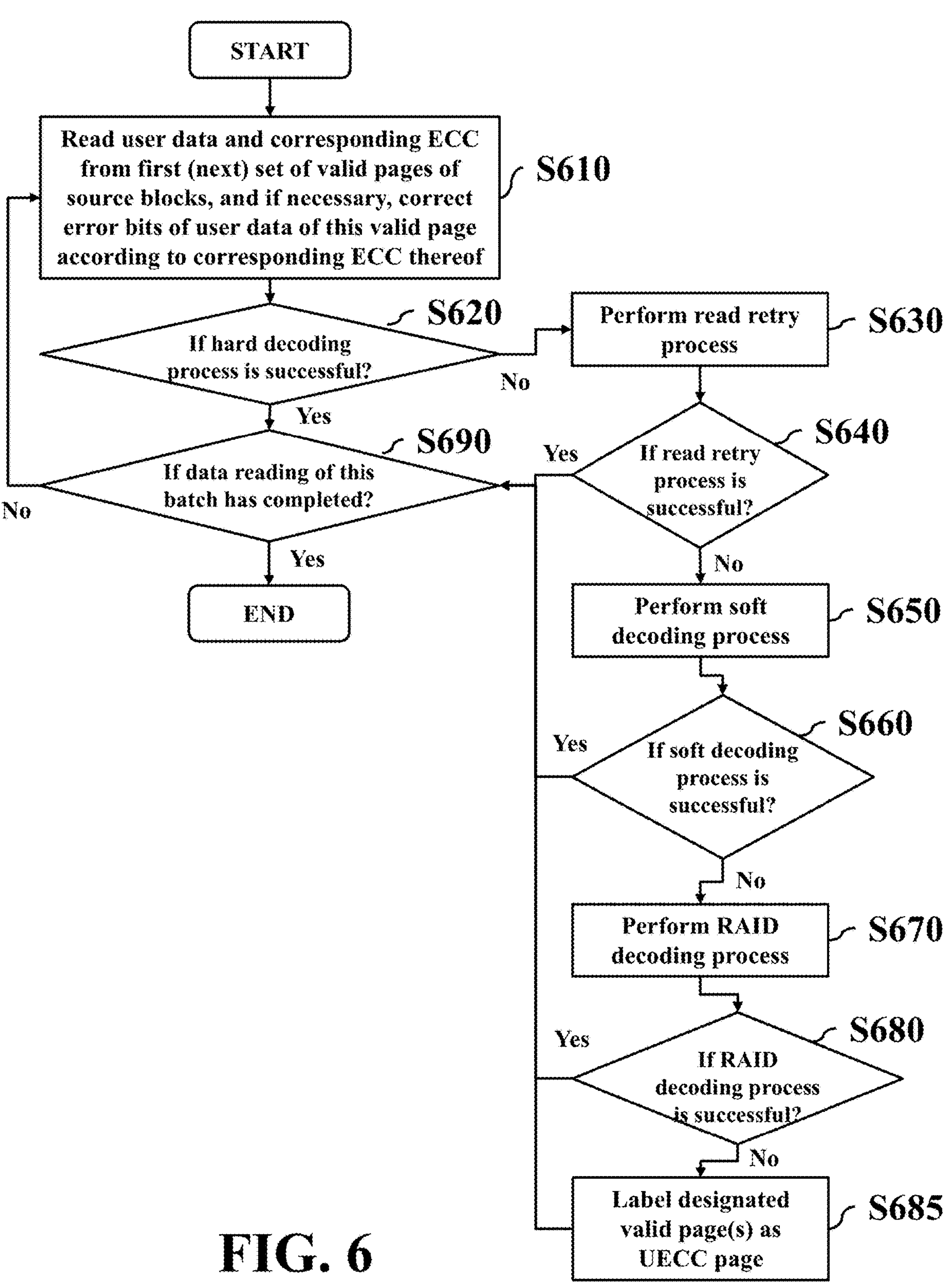
FIG. 6 is a flowchart illustrating a method for reading valid pages in one batch in a regular garbage collection (GC) process according to some implementations.

In the regular GC process, refer to the flowchart as shown in FIG. 6. The processing unit 134 when loading and executing program code of the firmware translation layer (FTL) performs the method for reading valid pages in one batch. It is noted that the processing unit 134 after completing the SPOR process enters the runtime mode to load and execute the program code of the FTL. The FTL is used to execute host commands received from the host side 110, and perform the background process, for example, the regular GC process, for improving the performance of device side during the idle periods. Detailed descriptions are provided as follows:

Step S610: The user data and the corresponding ECC are read from the first (or next) set of valid pages of the source blocks, and if necessary, error bits of the user data of this valid page are corrected according to the corresponding ECC thereof. This set of valid pages are included in the same SP. The operations performed in step S610 are referred to as the hard decoding process collectively.

Step S620: It is determined whether the hard decoding process is successful. If so, the process proceeds to step S690. Otherwise, the process proceeds to step S630.

Step S630: The read retry process is performed. In some embodiments, in addition to the set of recommended RVs, the manufacturer of the flash module 150 provides the re-read voltage table recording multiple sets of re-read voltages. In alternative embodiments, the re-read voltage table provided by the manufacturer of the flash module 150 records multiple sets of offset values, so that the processing unit 134 can obtain corresponding re-read voltages according to the recommended RVs and the corresponding set of offset values. The read retry process repeatedly executes a loop until the user data of the read page is correct or all sets of the re-read voltages have been tried.

Step S640: It is determined whether the read retry process is successful. If so, the process proceeds to step S690. Otherwise, the process proceeds to step S650.

Step S650: The soft decoding process is performed. In some embodiments, the FTL drives the soft decoder 137 to complete the soft decoding process. In alternative embodiments, the FTL invokes and executes program code of the subroutine, which includes the algorithms executed by the check-node calculation circuitry and the variable-node calculation circuitry of the soft decoder 137 to complete the soft decoding process.

Step S660: It is determined whether the soft decoding process is successful. If so, the process proceeds to step S690. Otherwise, the process proceeds to step S670.

Step S670: The RAID decoding process is performed. In some embodiments, the FTL drives the RAID engine 138 to complete the RAID decoding process. In alternative embodiments, the FTL invokes and executes program code of the subroutine, which includes the algorithms executed by the RAID engine 138 to complete the RAID decoding process.

Step S680: It is determined whether the RAID decoding process is successful. If so, the process proceeds to step S690. Otherwise, the process proceeds to step S685.

Step S685: One or more valid pages are labeled as the uncorrectable ECC (UECC) page. The UECC pages are the valid pages that cannot pass the hard decoding process, the read retry process, the soft decoding process, and the RAID decoding process.

Step S690: It is determined whether the data reading of this batch has completed. If so, the process ends. Otherwise, the process proceeds to step S610. The data reading of one batch includes the reading operations of the valid pages in multiple SPs from the source blocks.

Figure 7:
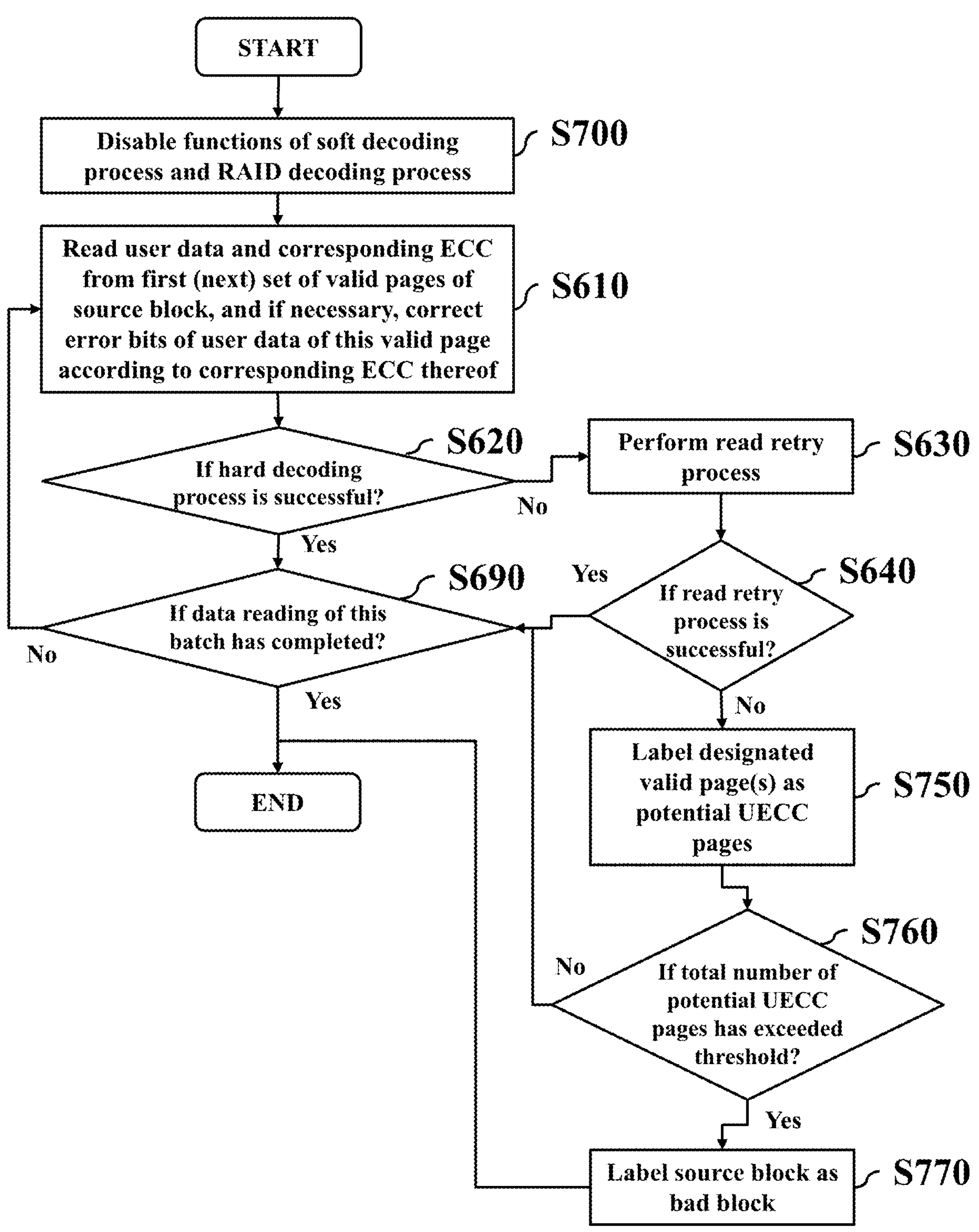
FIG. 7 is a flowchart illustrating a method for reading valid pages in one batch in a reduced GC process according to an embodiment of the invention.

However, the method as shown in FIG. 6 would require more time to read the user data of the valid pages, which is not conducive to insert the regular GC process during the preset time of the host side 110 waiting for the SPOR process. Therefore, in an aspect, an embodiment of the invention proposes FIG. 7 illustrating the flowchart of the method for the reduced GC process. The processing unit 134 when loading and executing program code of the boot program performs the method for reading valid pages of one source block.

Different from the flowchart as shown in FIG. 6, the method as shown in FIG. 7 removes the operations of steps S650, S660, S670, S680, and S685 to save time in performing the soft decoding process and the RAID decoding process. The operations of step S700 are appended before step S610. The operations of steps S750, S760 and S770 are appended after the "No" path of step S640. Detailed descriptions are provided as follows:

Step S700: Since the reduced GC process can conditionally invoke part of the program code of the regular GC process, the functions of the soft decoding process and the RAID decoding process are disabled to avoid the operations of steps S650, S660, S670, S680, and S685.

Step S750: After the read retry process fails, one or more valid pages are labeled as potential UECC pages. The potential UECC pages are the valid pages that cannot pass the hard decoding process and the read retry process. The FTL after entering the runtime mode would attempt to recover the user data of the potential UECC pages by using the soft decoding process and the RAID decoding process.

Step S760: It is determined whether a total number of the potential UECC pages has exceeded a threshold. If so, the process proceeds to step S770. Otherwise, the process proceeds to step S690. The threshold may be set to an amount of the designated ratio (such as 90% or above) of valid pages for this source block.

Step S770: This source block is labeled as a bad block. After that, the process ends.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

The term "device" or "module" is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 1-3, it should be noted that additional elements may be included to achieve better performance without departing from the spirit of the invention.

Each element of FIGS. 1-3 is composed of various circuitries and arranged to operably perform the aforementioned operations. While the process flows described in FIGS. 5-7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for performing a sudden power off recovery (SPOR) process, performed by a processing unit of a flash controller, comprising:

performing operations for the SPOR process after regaining power; and performing operations for a reduced garbage collection (GC) process, wherein an execution time of the operations for the SPOR process and the reduced GC process is limited to a preset time that a host side waits for a completion of the SPOR process by the flash controller.

2. The method of claim 1, wherein the reduced GC process comprises a loop that is repeatedly executed, and the loop comprises:

collecting user data of a plurality of valid pages from a source block;

determining whether a reading fail has occurred, or a first execution time of the reduced GC process has exceeded a predetermined time after collecting the user data of the valid pages from the source block;

exiting the SPOR process when the reading fail has occurred, or the first execution time of the reduced GC process has exceeded the predetermined time;

programming the user data of the valid pages into a physical page in a destination block when a reading is successful and the first execution time of the reduced GC process hasn't exceeded the predetermined time;

determining whether a second execution time of the reduced GC process has exceeded the predetermined time after programming the user data of the valid pages into the physical page in the destination block;

exiting the SPOR process when the second execution time of the reduced GC process has exceeded the predetermined time; and executing a next iteration of the loop when the second execution time of the reduced GC process hasn't exceeded the predetermined time.

3. The method of claim 2, comprising:

starting a timer to count from 0 at a beginning of the reduced GC process, wherein a counting value of the timer indicates the first execution time or the second execution time of the reduced GC process.

4. The method of claim 2, wherein the predetermined time is any time from 400 to 500 milliseconds (ms).

5. The method of claim 1, wherein an execution time of the SPOR process and the reduced GC process is limited to any time from 0.8 to 1 second.

6. The method of claim 1, wherein functions of a soft decoding process and a redundant array of independent disks (RAID) decoding process are disabled in the reduced GC process.

7. The method of claim 6, wherein, for user data of an erroneous page, the soft decoding process executes a bit flipping algorithm to generate new variable nodes according to soft bits corresponding to hard bits or variable nodes, and syndromes, and uses a formula to calculate soft bits of the new variable nodes; and the RAID decoding process generates corrected user data of the erroneous page according to user data of other pages, and data of a parity page in a page group.

8. A non-transitory computer-readable storage medium having stored therein program code that, when loaded and executed by a processing unit of a flash controller, causes the processing unit to:

perform operations for a sudden power off recovery (SPOR) process after regaining power; and perform operations for a reduced garbage collection (GC) process, wherein an execution time of the operations for the SPOR process and the reduced GC process is limited to a preset time that a host side waits for a completion of the SPOR process by the flash controller.

9. The non-transitory computer-readable storage medium of claim 8, wherein the reduced GC process comprises a loop that is repeatedly executed, the loop comprises:

collecting user data of a plurality of valid pages from a source block;

determining whether a reading fail has occurred, or a first execution time of the reduced GC process has exceeded a predetermined time after collecting the user data of the valid pages from the source block;

exiting the SPOR process when the reading fail has occurred, or the first execution time of the reduced GC process has exceeded the predetermined time;

programing the user data of the valid pages into a physical page in a destination block when a reading is successful and the first execution time of the reduced GC process hasn't exceeded the predetermined time;

determining whether a second execution time of the reduced GC process has exceeded the predetermined time after programming the user data of the valid pages into the physical page in the destination block;

exiting the SPOR process when the second execution time of the reduced GC process has exceeded the predetermined time; and executing a next iteration of the loop when the second execution time of the reduced GC process hasn't exceeded the predetermined time.

10. The non-transitory computer-readable storage medium of claim 9, wherein the program code that, when loaded and executed by the processing unit, causes the processing unit to:

start a timer to count from 0 at a beginning of the reduced GC process, wherein a counting value of the timer indicates the first execution time or the second execution time of the reduced GC process.

11. The non-transitory computer-readable storage medium of claim 9, wherein the predetermined time is any time from 400 to 500 milliseconds (ms).

12. The non-transitory computer-readable storage medium of claim 8, wherein an execution time of the SPOR process and the reduced GC process is limited to any time from 0.8 to 1 second.

13. The non-transitory computer-readable storage medium of claim 8, wherein functions of a soft decoding process and a redundant array of independent disks (RAID) decoding process are disabled in the reduced GC process, wherein, for user data of an erroneous page, the soft decoding process executes a bit flipping algorithm to generate new variable nodes according to soft bits corresponding to hard bits or variable nodes, and syndromes, and uses a formula to calculate soft bits of the new variable nodes; and the RAID decoding process generates corrected user data of the erroneous page according to user data of other pages, and data of a parity page in a page group.

14. An apparatus for performing a sudden power off recovery (SPOR) process, comprising:

a processing unit, arranged operably to: perform operations for the SPOR process after regaining power; and perform operations for a reduced garbage collection (GC) process, wherein an execution time of the operations for the SPOR process and the reduced GC process is limited to a preset time that a host side waits for a completion of the SPOR process by a flash controller.

15. The apparatus of claim 14, wherein the reduced GC process comprises a loop that is repeatedly executed, the loop comprises:

collecting user data of a plurality of valid pages from a source block;

determining whether a reading fail has occurred, or a first execution time of the reduced GC process has exceeded a predetermined time after collecting the user data of the valid pages from the source block;

exiting the SPOR process when the reading fail has occurred, or the first execution time of the reduced GC process has exceeded the predetermined time;

programming the user data of the valid pages into a physical page in a destination block when a reading is successful and the first execution time of the reduced GC process hasn't exceeded the predetermined time;

determining whether a second execution time of the reduced GC process has exceeded the predetermined time after programming the user data of the valid pages into the physical page in the destination block;

exiting the SPOR process when the second execution time of the reduced GC process has exceeded the predetermined time; and executing a next iteration of the loop when the second execution time of the reduced GC process hasn't exceeded the predetermined time.

16. The apparatus of claim 15, wherein the processing unit is arranged operably to: start a timer to count from 0 at a beginning of the reduced GC process, and a counting value of the timer indicates the first execution time or the second execution time of the reduced GC process.

17. The apparatus of claim 15, wherein the predetermined time is any time from 400 to 500 milliseconds (ms).

18. The apparatus of claim 14, wherein an execution time of the SPOR process and the reduced GC process is limited to any time from 0.8 to 1 second.

19. The apparatus of claim 14, wherein the processing unit is arranged operably to: disable functions of a soft decoding process and a redundant array of independent disks (RAID) decoding process in the reduced GC process.

20. The apparatus of claim 19, wherein, for user data of an erroneous page, the soft decoding process executes a bit flipping algorithm to generate new variable nodes according to soft bits corresponding to hard bits or variable nodes, and syndromes, and uses a formula to calculate soft bits of the new variable nodes; and the RAID decoding process generates corrected user data of the erroneous page according to user data of other pages, and data of a parity page in a page group.

* * * * *